United States Patent
McIlheran et al.

(10) Patent No.: US 9,878,737 B2
(45) Date of Patent: Jan. 30, 2018

(54) HYDRAULIC STEERING CONTROL SYSTEM

(71) Applicant: Caterpillar Inc., Peoria, IL (US)

(72) Inventors: Carl McIlheran, Channahon, IL (US); David A. Mork, Yorkville, IL (US); Daniel T. Mather, Lockport, IL (US); Christopher W. Johnson, Manteno, IL (US); Michael D. Hudson, Mt. Zion, IL (US)

(73) Assignee: Caterpillar Inc., Peoria, IL (US)

( * ) Notice: Subject to any disclaimer, the term of this patent is extended or adjusted under 35 U.S.C. 154(b) by 331 days.

(21) Appl. No.: 14/627,887

(22) Filed: Feb. 20, 2015

(65) Prior Publication Data
US 2016/0244090 A1  Aug. 25, 2016

(51) Int. Cl.
*B62D 5/065* (2006.01)
*B62D 5/07* (2006.01)
*B62D 5/093* (2006.01)

(52) U.S. Cl.
CPC ............. *B62D 5/093* (2013.01); *B62D 5/065* (2013.01); *B62D 5/075* (2013.01); *F15B 2211/212* (2013.01)

(58) Field of Classification Search
CPC .......... B62D 5/065; B62D 5/075; B62D 5/08; B62D 5/087; B62D 5/093
See application file for complete search history.

(56) References Cited

U.S. PATENT DOCUMENTS

| | | | |
|---|---|---|---|
| 4,052,929 A | | 10/1977 | Baatrup et al. |
| 4,336,687 A | * | 6/1982 | Morgan ................. B62D 5/097 60/384 |
| 4,463,558 A | | 8/1984 | Miller et al. |

(Continued)

FOREIGN PATENT DOCUMENTS

| | | | | |
|---|---|---|---|---|
| JP | 10203596 A | * | 8/1998 | |
| JP | 2013227004 A | * | 11/2013 | ............... B62D 1/22 |

OTHER PUBLICATIONS

Gilardino, et al., Flow Amplifiers in Hydrostatic Steering, Society of Automotive Engineers, Inc. Paper No. 2002-01-1358 (2002), 15 pages.

(Continued)

*Primary Examiner* — Joseph M Rocca
*Assistant Examiner* — Maurice L Williams
(74) *Attorney, Agent, or Firm* — Miller, Matthias & Hull

(57) ABSTRACT

A hydraulic fluid supply portion of a hydraulic steering control system may include an accumulator holding a quantity of pressurized steering fluid, and a priority valve. The priority valve may have a priority supply inlet port fluidly connected to the accumulator for receiving pressurized steering fluid from the accumulator, and a priority supply outlet port fluidly connected to a steering flow amplifier circuit. The priority valve may have a normally open position with a minimal pressure drop between the priority supply inlet port and the priority supply outlet port, and a flow restriction position where fluid flow between the ports is restricted. A load signal line from a steering control circuit to the priority valve may bias the priority valve toward the normally open position in response to an operator steering command to provide pressurized steering fluid to the steering flow amplifier circuit.

9 Claims, 2 Drawing Sheets

(56) References Cited

U.S. PATENT DOCUMENTS

| | | | | |
|---|---|---|---|---|
| 4,548,035 | A * | 10/1985 | Thomsen | B62D 5/09 60/384 |
| 4,620,416 | A * | 11/1986 | Yip | B62D 5/09 137/596.13 |
| 4,723,475 | A | 2/1988 | Burk | |
| 4,914,913 | A | 4/1990 | St. Germain et al. | |
| 5,056,311 | A * | 10/1991 | Tischer | B62D 5/07 180/403 |
| 5,186,211 | A | 2/1993 | Stephenson et al. | |
| RE34,746 | E | 10/1994 | Schutten et al. | |
| 5,934,406 | A * | 8/1999 | Dvorak | B62D 5/09 180/403 |
| 7,849,956 | B2 | 12/2010 | Khalil et al. | |
| 8,756,930 | B2 | 6/2014 | Johnson et al. | |
| 2004/0149509 | A1* | 8/2004 | Budaker | B62D 5/30 180/403 |
| 2005/0161278 | A1* | 7/2005 | Harnischfeger | B62D 5/093 180/441 |
| 2006/0131098 | A1* | 6/2006 | Schmidt | B62D 5/075 180/417 |
| 2006/0248883 | A1* | 11/2006 | Gehlhoff | B62D 5/093 60/469 |
| 2008/0135325 | A1* | 6/2008 | Stuhldreher | B62D 5/0837 180/442 |
| 2010/0228439 | A1* | 9/2010 | Nakamura | B62D 5/065 701/41 |
| 2014/0083792 | A1* | 3/2014 | Imanishi | B62D 1/22 180/403 |
| 2014/0083793 | A1* | 3/2014 | Osterberg | B62D 5/065 180/441 |
| 2016/0200349 | A1* | 7/2016 | Whitaker, Jr. | B62D 5/062 180/421 |
| 2016/0290367 | A1* | 10/2016 | Lillemets | E02F 9/2225 |
| 2016/0298658 | A1* | 10/2016 | Liljenberg | F15B 11/08 |

OTHER PUBLICATIONS

Systems Operation—797 Off-Highway Truck Steering System Steering Control Valve, Caterpillar Inc. Media No. RENR 2609-16 (2003), 10 pages.

OSQ Flow Amplifier-Functional Description, Sauer-Danfoss, 12 pages.

Systems Operations—797 Off-Highway Truck Steering System—Metering Pump (Steering), Caterpillar Inc. Media No. RENR2609-16 (2003), 12 pages.

* cited by examiner

HYDRAULIC STEERING CONTROL SYSTEM

TECHNICAL FIELD

The present disclosure relates generally to hydraulic steering control systems and, more particularly, to a load responsive flow amplified control system with directional flow and flow amplification and incoming hydraulic fluid flow provided by high pressure accumulators providing hydraulic fluid through a priority valve to control the incoming fluid pressure.

BACKGROUND

Flow amplified steering systems are sometimes used on earthmoving and industrial type mobile vehicles. Such systems normally comprise a steering control or metering circuit and a directional control circuit. The main directional control circuit usually includes a pilot operated directional control valve which controls the flow of pressurized fluid from a source pump to and from one or more bidirectional steering motors or cylinders. The basic component of the steering circuit is normally a hand metering unit (HMU) which directs a metered volume of fluid to a selected end of the directional control valve in response to rotation of a steering wheel connected to the HMU. The degree of movement of the directional control valve is controlled by the degree of rotation of the steering wheel. If the steering wheel is rotated slowly, a low volume of pilot fluid will be directed to the directional control valve resulting in low spool movement. A faster rotation of the steering wheel directs a larger volume of pilot fluid to the directional control valve resulting in greater movement of the directional control valve. The volume of fluid directed to the steering motor is typically many times greater than the volume of pilot fluid directed to the directional control valve and is dependent upon the degree of the movement of the directional control valve and thus the degree and speed of rotation of the steering wheel.

One such system is disclosed in U.S. Pat. No. 4,914,913 to St. Germain et al. and issued on Apr. 10, 1990. In the reference patent, a load responsive flow amplified control system includes a directional control valve movable to an operating position to direct fluid from the operating fluid circuit through a first variable orifice to a steering motor and to direct control fluid from a control fluid circuit through a second variable orifice to be combined with the fluid going to the steering motor. The operating fluid circuit and the control fluid circuit are provided with fluid from a common variable displacement pump. The directional control valve is moved to an operating position by the control fluid acting thereon and is pressure compensated insofar as the flow of control fluid passing through the second variable orifice such that a substantially constant predetermined pressure differential exists across the second variable orifice. The rate of fluid flow in the pilot control circuit is determined by a steering control valve and is utilized for controlling the position of the directional control valve. The displacement of the variable displacement pump is responsive to the pressure condition in the pilot control circuit such that a substantially constant predetermined pressure differential exists between the variable displacement pump and the load pressure in the steering motor. The relative size of the variable orifices determines the amplification ratio between the pilot control circuit and the power operating circuit.

The variable displacement pump used as the primary source of hydraulic fluid in the load responsive flow amplified control system typically must be of substantial size to provide hydraulic fluid to the control system and other systems of the machine in which the control system is implemented. Additionally, backup sources still must be implemented to ensure that the machine does not lose steering control in the event of a failure of the primary pump. Such backup sources, which may be in the form of a backup pump or pressurized fluid accumulators, require additional space within the machine, and can increase the overall size of the machine or require the elimination of other features of the machine in the interest of conserving space and manufacturing costs. In view of this, opportunities exist for improving the space utilization and compactness of machines having load responsive flow amplified control systems.

SUMMARY OF THE DISCLOSURE

In one aspect of the present disclosure, a hydraulic fluid supply portion of a hydraulic steering control system is disclosed. The hydraulic steering control system may have a steering cylinder, a steering flow amplifier circuit in fluid communication with the steering cylinder to provide pressurized steering fluid to actuate the steering cylinder, and a steering control circuit in fluid communication with the steering flow amplifier circuit to provide pilot signals to the steering flow amplifier circuit indicative of a direction and speed with which to provide pressurized steering fluid to actuate the steering cylinder. The hydraulic fluid supply portion may include an accumulator holding a quantity of pressurized steering fluid and having an accumulator supply conduit, and a priority valve. The priority valve may have a priority supply inlet port fluidly connected to the accumulator supply conduit for receiving pressurized steering fluid from the accumulator, and a priority supply outlet port fluidly connected to an amplifier circuit supply inlet port of the steering flow amplifier circuit. The priority valve may have a normally open position where pressurized fluid is directed from the priority supply inlet port to the priority supply outlet port with a minimal pressure drop and a flow restriction position where pressurized fluid flow from the priority supply inlet port to the priority supply outlet port is restricted by a maximum restriction amount, and a load signal line may fluidly connect the steering control circuit to the priority valve to provide a load signal indicative of an amount of pressurized steering fluid to be provided to the steering flow amplifier circuit in response to an operator steering command, and the load signal may bias the priority valve toward the normally open position.

In another aspect of the present disclosure, a hydraulic steering control system is disclosed. The hydraulic steering control system may include a steering cylinder, a steering flow amplifier circuit in fluid communication with the steering cylinder to provide pressurized steering fluid to actuate the steering cylinder, and a steering control circuit in fluid communication with the steering flow amplifier circuit to provide pilot signals to the steering flow amplifier circuit indicative of a direction and speed with which to provide pressurized steering fluid to actuate the steering cylinder. The hydraulic steering control system may further include a hydraulic fluid supply portion having an accumulator holding a quantity of pressurized steering fluid and having an accumulator supply conduit, and a priority valve. The priority valve may include a priority supply inlet port fluidly connected to the accumulator supply conduit for receiving pressurized steering fluid from the accumulator, and a priority supply outlet port fluidly connected to an amplifier circuit supply inlet port of the steering flow amplifier circuit. The priority valve may have a normally open position where pressurized fluid is directed from the priority supply inlet port to the priority supply outlet port with a minimal pressure drop and a flow restriction position where pressurized fluid flow from the priority supply inlet port to the priority supply outlet port is restricted by a maximum restriction amount. A load signal line may fluidly connect the steering control circuit to the priority valve to provide a load signal indicative of an amount of pressurized steering fluid to be provided to the steering flow amplifier circuit in response to an operator steering command, and the load signal may bias the priority valve toward the normally open position.

Additional aspects are defined by the claims of this patent.

DETAILED DESCRIPTION

Figure 1:
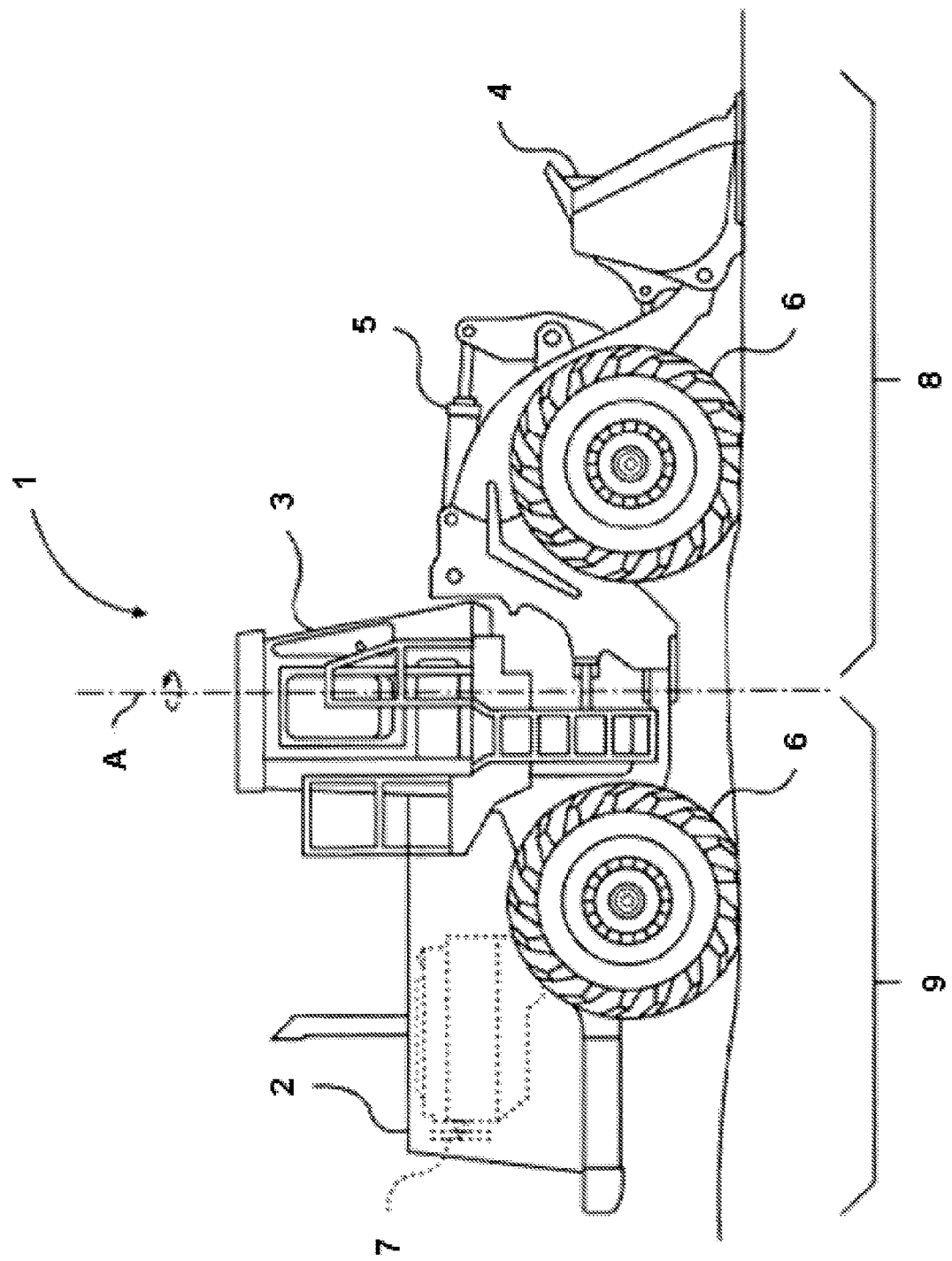
FIG. 1 is a diagrammatic illustration of an exemplary work machine.

FIG. 1 shows an exemplary work machine 1 that may incorporate an hydraulic steering control system as disclosed herein. The work machine 1 may include an engine housing 2, an operator station 3, and a work implement 4, such as, for example, a bucket for digging and loading material. In the example of the work machine 1 being a wheel loader, the work implement 4 may be powered and controlled by a number of actuators, including a tilt actuator 5. The work machine 1 may further include front and rear ground engaging devices, such as front and rear wheels 6 that support the work machine 1. The engine housing 2 may include a power source, such as an engine 7, that may provide power to the front and/or rear wheels 6.

To drive the work machine 1, an operator may manipulate one or more steering input devices that may be housed within the operator station 3. The input devices may ultimately steer the work machine 1 by extending and retracting hydraulic steering actuators (not shown in FIG. 1). In the example of work machine 1 being a wheel loader, the work machine 1 may include a front end 8 and a back end 9. The hydraulic steering actuators may extend between the front and back ends 8, 9 and may be configured to articulate the front end 8 relative to the back end 9 about an articulation axis A. Although the hydraulic steering control system is discussed with reference to an articulating work machine, the principles and system described herein are equally applicable to a more conventional hydraulic steering system that may turn the wheels relative to the work machine body to steer the work machine.

Figure 2:
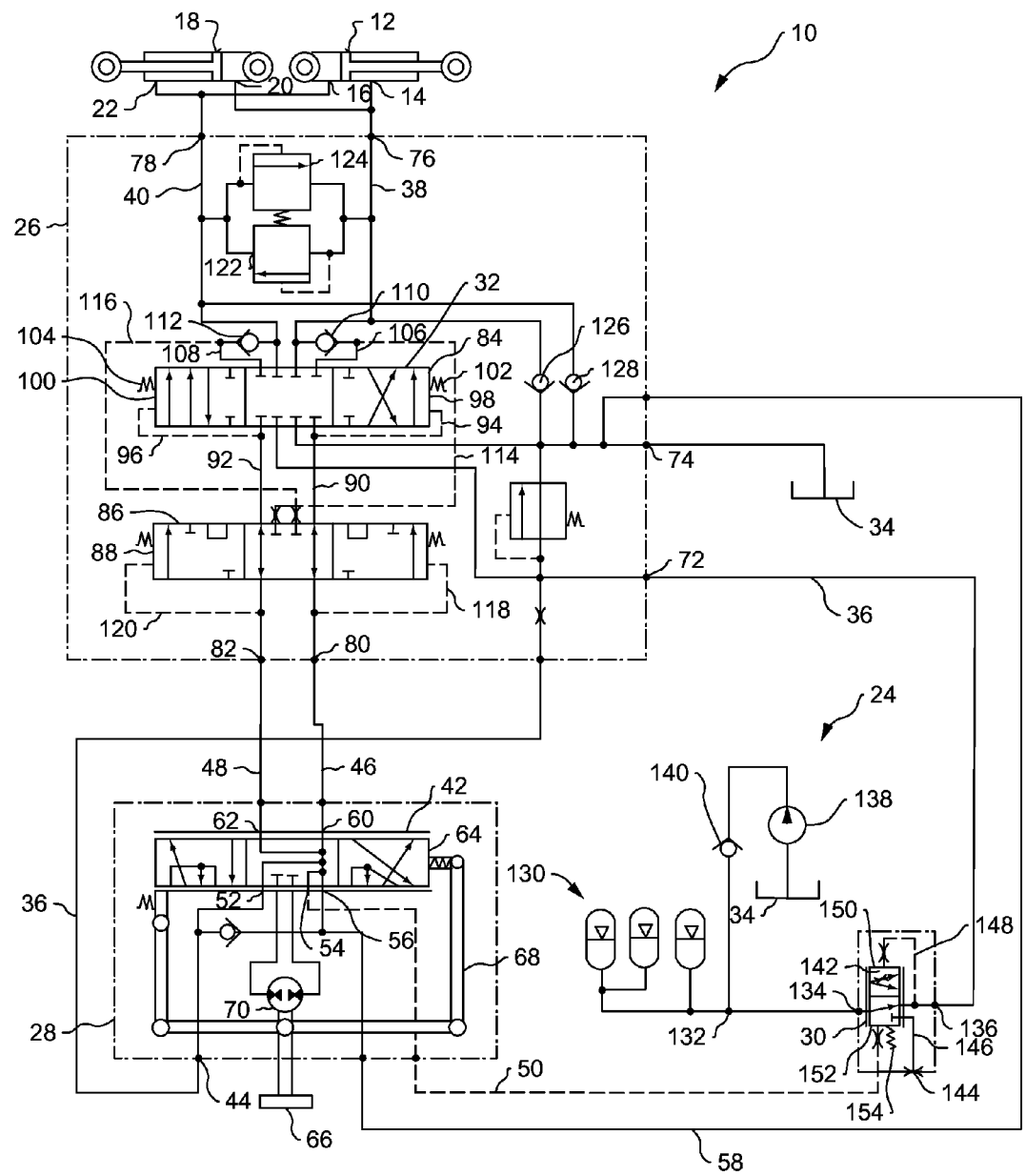
FIG. 2 a schematic view of a hydraulic steering control system in accordance with the present disclosure for the work machine of FIG. 1.

Referring to FIG. 2, a hydraulic steering control system 10 for the work machine 1 may include a first double acting steering cylinder 12 having a pair of operating ports 14, 16, a second double acting steering cylinder 18 having a pair of operating ports 20, 22, a pressurized hydraulic fluid supply portion 24, a steering flow amplifier circuit 26, and a steering control or metering circuit 28. The hydraulic fluid supply portion 24 may include a pressure responsive priority valve 30 associated therewith. The steering flow amplifier circuit 26 may include a pressure compensated directional control valve 32, a tank 34, a supply conduit 36 connected to the hydraulic fluid supply portion 24 and to the directional control valve 32, and a pair of steering cylinder conduits 38, 40 connected to the directional control valve 32 and to the operating ports 14, 20 and 16, 22, respectively, of the steering cylinders 12, 18. The control fluid circuit 28 may include a steering control valve 42 connected to the supply conduit 36 through a supply port 44 disposed ahead of the steering control valve 42, and a pair of pilot lines 46, 48 connected to the steering control valve 42 and to the steering flow amplifier circuit 26. A load signal line 50 may connect the steering control valve 42 to the priority valve 30.

The steering control valve 42 in this embodiment is the type commonly referred to as a hand metering unit (HMU) and may include a fluid inlet port 52 connected to the supply conduit 36, a load signal port 54 connected to the load signal line 50, a return port 56 connected via a return line 58 to the tank 34, a right turn port 60 connected to the pilot line 46 and a left turn port 62 connected to the pilot line 48. The steering control valve 42 may further include a steering control spool 64 that is moveable from a neutral position to either a right turn position or a left turn position. In either of the turn positions, the steering control spool 64 establishes a variable flow path between the inlet port 52 and the respective right turn port 60 or left turn port 62. A steering wheel 66 or other type of steering command input device may be conventionally connected to the steering control spool 64 via a linkage assembly 68 for moving the steering control spool 64 to the turn position in response to an operator turning the steering wheel 66. A metering mechanism 70 may be provided for directing a regulated volume of pressurized control fluid from the supply conduit 36 through the steering control spool 64 and into the respective pilot line 46, 48 when the steering control spool 64 is moved to one of the turn positions. The metering mechanism 70 can be, for example, a gerotor metering mechanism connected to the steering wheel 66 by means of the linkage assembly 68. The load signal line 50 and the priority valve 30 may provide a means for maintaining a substantially constant pressure differential between the fluid in the supply conduit 36 and the control fluid in the downstream side of the steering control valve 42 when the steering control spool 64 is in one of the turn positions.

At the neutral position of the steering control valve 42, the supply port 44, the pilot lines 46, 48, and the load signal line 50 are all connected by the return line 58 to the tank 34, and the metering mechanism 70 is blocked from the other lines and ports. With the steering control spool 64 moved leftwardly to the right turn position in response to turning the steering wheel 66 to the right, the supply port 44 is in fluid communication with one port of the steering mechanism 70 and the load signal port 54, the other port of the steering mechanism 70 is in communication with the pilot line 46 via the right turn port 60, and the pilot line 48 via the left turn port 62 is in communication with the return line 58 via the return port 56. Similarly, with the steering control spool 64 moved rightwardly to the left turn position in response to turning the steering wheel 66 to the left, the supply port 44 is in fluid communication with other port of the steering mechanism 70 and the load signal port 54, the one port of the steering mechanism 70 is in communication with the pilot line 48 via the left turn port 62, and the pilot line 46 via the right turn port 60 is in communication with the return line 58 via the return port 56. Those skilled in the art will understand that the configuration of the fluid control circuit 28 is exemplary, and other mechanisms for converting an operator steering input into signals in the pilot lines 46, 48 indicating a steering direction and speed are contemplated by the inventors as having use in hydraulic steering control systems in accordance with the present disclosure.

The steering flow amplifier circuit 26 may include a supply inlet port 72 connected to the supply conduit 36, an outlet port 74 connected to the tank 34, a pair of steering cylinder ports 76, 78 connected to the operating ports 14, 20 and 16, 22, respectively, a pair of control fluid ports 80, 82 connected to the pilot lines 46, 48, respectively, a directional control spool 84 in the directional control valve 32, and a selector valve 86 having a selector spool 88. A pair of control fluid passages 90, 92 may extend between the directional control valve 32 and the selector valve 86. A pair of pilot passages 94, 96 may be fluidly connect the control fluid passages 90, 92 with opposite ends 98, 100 of the directional control spool 84. Springs 102, 104 are disposed at either end 98, 100 of the directional control spool 84 in a preloaded condition to resist movement of the directional control spool 84 in either direction. A pair of fluid combiner passages 106, 108 may be connected to the steering cylinder conduits 38, 40, respectively, through a pair of check valves 110, 112. A pair of signal passages 114, 116 may connect the directional control valve 32 with the fluid combiner passages 106, 108, respectively. Another pair of pilot passages 118, 120 may individually connect the control fluid ports 80, 82 with the opposite ends of the selector spool 88. The spool 84 of the directional control valve 32 may be moveable between a neutral and right and left turn positions. At the turn positions, a plurality of infinitely variable flow paths are established between the various ports and passages as hereinafter described in more detail.

To relieve the pressure and prevent cavitation in the expanding sides of the steering cylinders 12, 18 during wheel impact situations, the steering flow amplifier circuit 26 may further include shock relief valves 122, 124 connecting the steering cylinder conduits 38, 40 to each other for potential flow in opposite directions, and anti-cavitation check valves 126, 128 connecting the steering cylinder conduits 38, 40, respectively, to the outlet port 74 and the tank 34. When an impact with an object causes the wheels to turn sharply in the direction that increases the pressure at the operating ports 14, 20 and decreases the pressure at the operating ports 16, 22, for example, the shock relief valve 122 may open to simultaneously vent fluid from the steering cylinder conduit 38 and provide fluid to the steering cylinder conduit 40 after a predetermined line pressure is reached in the steering cylinder conduit 38. At the same time, the reduced pressure in the steering cylinder conduit 40 may force the anti-cavitation check valve 128 to draw steering fluid flowing to the tank 34 into the steering cylinder conduit 40 and to the operating ports 16, 22 to prevent cavitation within the steering cylinders 12, 18. In a similar manner for impacts causing the wheels to turn sharply in the opposite direction, the shock relief valve 124 opens to vent steering fluid from the steering cylinder conduit 40 to the steering cylinder conduit 38, and the anti-cavitation check valve 126 may open to provide steering fluid to fill the expanding cavities at the operating ports 14, 20.

At the neutral position of the directional control valve 32, the supply inlet port 72, the outlet port 74, the steering cylinder ports 76, 78, the control fluid passages 90, 92 and the fluid combiner passages 106, 108 are all blocked from each other. With the directional control spool 84 moved leftwardly to the right turn position, the supply inlet port 72 is in fluid communication with the steering control port 76 through a variable flow path, the control fluid passage 90 is in communication with the fluid combiner passage 106 through a variable flow path, the steering control port 78 is in communication with the outlet port 74 through a variable flow path, and the control fluid passage 92 is blocked from the fluid combiner passage 108. Similarly with the direction control spool 84 moved rightwardly to the left turn position, the supply inlet port 72 is in communication with the steering control port 78 through a variable flow path, the control fluid passage 92 is in communication with the fluid combiner passage 108 through a variable flow path, the steering control port 76 is in communication with the outlet port 74 through a variable flow path, and the control fluid passage 90 is blocked from the fluid combiner passage 106.

The selector spool 88 is moveable between the centered neutral position shown and first and second actuated positions. At the neutral position the control fluid ports 80, 82 are in communication with the control fluid passages 90, 92 respectively and the pilot passages 94, 96, respectively, and the signal passages 114, 116 are blocked from each other and from the control fluid passages 90, 92 and the pilot passages 94, 96. With the selector spool 88 moved leftwardly to a first actuated position the control fluid port 80 is in communication with the control fluid passage 90 and the pilot passage 94, the signal passage 114 is in communication with the control fluid passage 92 and the pilot passage 96 and the control fluid port 82 and the signal passage 116 are blocked. Similarly with the selector spool 88 moved rightwardly to the second actuated position the control fluid port 82 is in communication with the control fluid passage 92 and the pilot passage 96, the signal passage 116 is in communication with the control fluid passage 90 and the pilot passage 94, and the control fluid port 80 and the signal passage 114 are blocked. The selector spool 88, the pilot passages 94, 96, and the signal passages 114, 116 provide a mechanism for communicating the fluid combiner passages 106, 108 with the ends 98, 100, respectively, of the directional control spool 84 when the selector spool 88 is in one of the turn positions. The steering flow amplifier circuit 26 in the illustrated embodiment is exemplary and those skilled in the at will understand that other configurations of circuits for converting signals in the pilot lines 46, 48 into turning of the steering mechanism of the machine 1 in a commanded direction and speed may be implemented in the system 10, and the use of such mechanisms are contemplated by the inventors.

In the hydraulic fluid supply portion 24, pressurized fluid for the steering control system 10 may be provided by one or more gas charged accumulators 130. The accumulator(s) 130 may be connected by a supply conduit 132 to a supply inlet port 134 of the priority valve 30, while the supply conduit 36 to the steering flow amplifier circuit 26 and the steering control circuit 28 is connected to a supply outlet port 136 of the priority valve 30. The gas charged accumulator(s) 130 may have sufficient capacity for providing the necessary volume of steering fluid for operation of the steering control system 10 during normal operating conditions for a specified period of operation. The fluid in the accumulator(s) 130 may be replenished when necessary via a pump 138 drawing fluid from the tank 34 and discharging pressurized fluid through a pump discharge conduit 139 to the accumulator(s) 130. The pump discharge conduit 139 may include a check valve 140 to prevent backflow of pressurized fluid from the accumulator(s) 130 into the pump 138. Fluid level sensors (not shown) may be provided with the accumulator(s) 130 to measure the amount of fluid within the accumulator(s) 130, and transmit control signals to an electronic control module (not shown) of the machine 1 that may in turn transmit control signals to the pump 138 to actuate and replenish the fluid in the accumulator(s) 130 when the fluid within the accumulator(s) 130 is less than a specified minimum accumulator fluid amount.

The priority valve 30 may function to regulate the fluid pressure and the flow rate provided to the steering control system 10 by the accumulator(s) 130. The priority valve 30 may include a priority valve spool 142 that is slidable between a normal open position where fluid is directed from the supply inlet port 134 to the supply outlet port 136 with a minimal pressure drop, and a flow restriction position where fluid flow to the supply conduit 36 is restricted and the fluid is partially diverted to a capped excess flow port 144 through a conduit 146. A signal passage 148 allows the pressure at the supply outlet port 136 to act on one end 150 of the priority valve spool 142 while an opposite end 152 is biased toward the normal open position by a spring 154 and the pressure in the load signal line 50. While the priority valve 30 in the present embodiment is illustrated and described as being a component of the fluid supply portion 24, in alternate embodiments, the priority valve 30 may function in the same manner with similar connections as a part of the steering flow amplifier circuit 26, and may be installed within a common housing for the circuit 26.

INDUSTRIAL APPLICABILITY

Prior to being put into operation but with the accumulator(s) 130 charged with steering fluid, the signal port 54 may be vented to the tank 34 through the outlet port 56 such that the pressure in the signal passage 148 maintains the priority valve spool 142 at a position to provide a minimum standby pressure in the supply conduit 36. To initiate a right turn, the operator may rotate the steering wheel 66 in the appropriate direction or otherwise manipulate a steering input device to move the steering control valve 42 to the left to direct pressurized fluid from the inlet port 52 through the metering mechanism 70, and into the pilot line 46. The metering mechanism 70 may be responsive to movement of the steering control valve 42 and functions to measure or regulate the amount or volume of control fluid passing through the steering control valve 42 dependent upon the degree of rotation of the steering wheel. The pressure downstream of the fluid inlet port 52 is transmitted through the load signal line 50 to the priority control valve 30. The pressure in the load signal line 50 may act on the end 152 of the priority valve spool 142 to move the spool 142 toward the open position and increase the pressure supplied to the steering control system 10 through the supply conduit 36 to a predetermined level.

The pressurized control fluid in the pilot line 46 may pass through the control fluid port 80, the selector spool 88, and into the control fluid passage 90 and the pilot passage 94. The control fluid passage 90 is initially blocked by the directional control spool 84 and the pressure in the control fluid passage 90 and control fluid port 80 starts to increase due to the spring 104 resisting movement of the directional control spool 84 to the left. The initial increase in the control fluid pressure is immediately transmitted through the pilot passage 118, resulting in a pressure differential in the pilot passages 118, 120 causing the selector spool 88 to move to the left to the first actuated position to maintain communication between the control fluid port 80 and the control fluid passage 90 and the pilot passage 94, and to communicate the pilot passage 96 with the signal passage 114. This establishes a flow path from the end 100 of the directional control spool 84 through the pilot passage 96, the signal passage 114 and the fluid combiner passage 106 to the check valve 110.

However, since the load pressure in the steering cylinder port 46 acts against the back side of the check valve 110, the pressure of the control fluid must increase to a level which is greater than the load pressure in the steering cylinder port 76 by an amount equivalent to the preload of the spring 104 before the directional control spool 84 can move to the left. Once the pressure of the control fluid reaches such level, the directional control spool 84 will move to the left. The fluid exhausted from the end 100 of the directional control spool 84 is transmitted through the pilot passage 96, the signal passage 114 and into the fluid combiner passage 106 where it unseats the check valve 110 and passes into the steering cylinder port 76.

As previously noted, with the directional control spool 84 in a right turn position, variable flow paths may be established across the directional control spool 84. At the right turn position, the control fluid from the control fluid passage 90 passes through the directional control spool 84, the fluid combiner passage 106, the check valve 110 and into the steering cylinder port 76. Also, pressurized operating fluid from the supply conduit 36 may pass through the inlet port 72, the directional control spool 84, the steering cylinder 76, the operating ports 14, 20 and into the steering cylinders 12, 18. The combined flow of fluid passing through the directional control spool 84 and into the steering cylinders 12, 18 moves the steering cylinders 12, 18 to turn the wheels to the right. The fluid exhausted from the steering cylinders 12, 18 passes through the steering cylinder conduit 40 and the directional control spool 84 to the tank 34.

The flow of control fluid across the directional control spool 84 may generate a pressure drop with the fluid pressure downstream thereof now being transmitted through the signal passage 114, the selector spool 88, a portion of the control fluid passage 92 and the pilot passage 96 to the end 100 of the directional control spool 84. Since the pressure upstream and downstream of the directional control spool 84 acts on the opposite ends 98, 100, respectively, of the directional control spool 84, the directional control spool 84 functions as a pressure compensated valve to maintain a substantially constant predetermined pressure drop across the directional control spool 84 as determined by the force of springs 100, 102.

Since the pressure of the control fluid downstream of the steering control spool 64 is responsive to the load on the steering cylinders 12, 18 by virtue of the flow path between the steering control valve 42 and the steering motor operating ports 14, 16, the steering control circuit 28 is essentially a load sensing circuit whereby the output of the priority valve 30 is adjusted to provide sufficient flow through the supply conduit 36 to maintain a desired pressure differential across the orifice between the supply conduit 36 and the pilot line 46. Moreover since the operating fluid passing through the directional control spool 84 also comes from the supply conduit 36, sufficient flow is provided by the priority valve 30 to maintain a desired pressure drop across the directional control spool 84. The supply conduit 36 may include a flow control orifice just upstream of the fluid inlet port 52 that is sized to fine tune the system.

The rotational speed of the steering wheel 66, or speed of manipulation of alternative steering command input devices, may determine the pressure in the pilot line 46 during turns and the amount of movement of the directional control spool 84 to a turn position and how quickly it reaches such position, while the number of revolutions of the steering wheel 66 may determine how long the directional control spool 84 will remain at the turn position and hence the amount of movement of the steering cylinders 12, 18. Once rotation of the steering wheel 66 is stopped, the flow of control fluid through the pilot line 46 stops, and the directional control spool 84 returns to the neutral position shown under the influence of the springs 102, 104 to hydraulically lock the steering cylinders 12, 18 at the turn position. The steering cylinders 12, 18 are returned to their starting positions by turning the steering wheel 66 in a left turn direction thereby causing the directional control spool 84 to move rightwardly in a manner similar to that described above.

The hydraulic steering control system 10 in accordance with the present disclosure may provide improved efficiency over previous control systems such as that in the St. Germain patent that utilize a variable displacement pump as the primary source of pressurized steering fluid that is pressure responsive to a load signal from a steering control valve. In such prior systems, the primary pump must be sized sufficiently large to provide enough pressurized fluid to the system to control the turning of the wheels. Even with the large pump, it is still necessary to provide a secondary pressurized fluid source in the form of accumulators or a backup fluid pump. In the present system, the accumulator(s) 130 provide the primary fluid source and have capacities for ample fluid flow during peak usage of the steering control system 10. The pump 138 is provided to recharge the accumulator(s) 130 when necessary, and to be connected to the supply conduit 36 to provide the secondary pressurized fluid source in the event of a failure of the accumulator(s) 130. With this arrangement, the pump 138 can be reduced in size and capacity as it is not required to meet the full load requirements of the fluid control system 10. As such, the space and energy consumption required for the pump 138 are also reduced.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A hydraulic steering control system comprising:
   a steering cylinder;
   a steering flow amplifier circuit in fluid communication with the steering cylinder to provide pressurized steering fluid to actuate the steering cylinder;
   a steering control circuit in fluid communication with the steering flow amplifier circuit to provide pilot signals to the steering flow amplifier circuit indicative of a direction and speed with which to provide pressurized steering fluid to actuate the steering cylinder; and
   a hydraulic fluid supply portion comprising:
      an accumulator holding a quantity of pressurized steering fluid and having an accumulator supply conduit, and
      a priority valve having a priority supply inlet port fluidly connected to the accumulator supply conduit for receiving pressurized steering fluid from the accumulator, a priority supply outlet port fluidly connected to an amplifier circuit supply inlet port of the steering flow amplifier circuit, wherein the priority valve has a normally open position where pressurized fluid is directed from the priority supply inlet port to the priority supply outlet port with a minimal pressure drop and a flow restriction position where pressurized fluid flow from the priority supply inlet port to the priority supply outlet port is restricted by a maximum restriction amount, wherein a load signal line fluidly connects the steering control circuit to the priority valve to provide a load signal indicative of an amount of pressurized steering fluid to be provided to the steering flow amplifier circuit in response to an operator steering command, and wherein the load signal biases the priority valve toward the normally open position; and
   wherein the steering flow amplifier circuit comprises:
      a directional control valve having a directional valve supply port fluidly connected to the amplifier circuit supply inlet port, a steering cylinder port fluidly connected to the steering cylinder, a control fluid passage in fluid communication with the steering control circuit, a fluid combiner passage, a directional control spool having a first directional spool end and a second directional spool end and being movable between a neutral position at which the directional valve supply port is blocked from the steering cylinder port and the control fluid passage is blocked from the fluid combiner passage and an infinitely variable operating position at which a first variable flow path is established between the control fluid passage and the fluid combiner passage and a second variable flow path is established between the directional valve supply port and the steering cylinder port;
      a check valve combining the fluid in the fluid combiner passage with the fluid in the steering cylinder port when the direction control spool is at an operating position;
      a directional valve pilot passage connected to the control fluid passage and the first directional spool end; and
      a spring for resisting movement of the directional control spool toward the operating position.

2. The hydraulic steering control system of claim 1, wherein the priority valve comprises a priority spring biasing the priority valve toward the normally open position.

3. The hydraulic steering control system of claim 1, wherein the priority valve comprises a priority signal passage placing the priority supply outlet port in fluid communication with the priority valve to bias the priority valve toward the flow restriction position.

4. The hydraulic steering control system of claim 1, wherein the priority valve comprises:
   a priority valve spool having a first end and a second end and being slidable between the normally open position and the flow restriction position;

a priority spring engaging the first end of the priority valve spool and biasing the priority valve spool toward the normally open position; and a priority signal passage placing the priority supply outlet port in fluid communication with the second end of the priority valve spool to bias the priority valve toward the flow restriction position, wherein the load signal line is in fluid communication with the first end of the priority valve spool so that the load signal biases the priority valve spool toward the normally open position.

5. The hydraulic steering control system of claim 1, wherein the hydraulic fluid supply portion comprises a pump having a pump discharge conduit fluidly connected to the accumulator and discharging pressurized steering fluid into the accumulator.

6. The hydraulic steering control system of claim 5, wherein the hydraulic fluid supply portion comprises a fluid level sensor installed at the accumulator and measuring an amount of pressurized steering fluid in the accumulator, wherein the pump is actuated to replenish the fluid in the accumulator when the fluid level sensor indicates that the amount of fluid in the accumulator is less than a minimum accumulator fluid amount.

7. The hydraulic steering control system of claim 1, wherein the amount of restriction between the priority supply inlet port to the priority supply outlet port is infinitely variable from a minimum restriction amount to the maximum restriction amount as the priority valve moves from the normally open position to the flow restriction position.

8. The hydraulic steering control system of claim 1, wherein the steering control circuit comprises a steering control valve having a steering fluid inlet port, and wherein the load signal line places the steering fluid inlet port in fluid communication with the priority valve when the steering control circuit provides pilot signals to the steering flow amplifier circuit in response to the operator steering command.

9. The hydraulic steering control system of claim 1, wherein the steering flow amplifier circuit comprises a directional valve signal passage for placing the fluid combiner passage in fluid communication with the second directional spool end.

* * * * *